US010224975B2

(12) United States Patent
Petersen et al.

(10) Patent No.: US 10,224,975 B2
(45) Date of Patent: Mar. 5, 2019

(54) PORTABLE ELECTRONIC SYSTEM WITH IMPROVED WIRELESS COMMUNICATION (71) Applicant: Oticon A/S, Smørum (DK)

(72) Inventors: Morten Elo Petersen, Smørum (DK); Thomas Gleerup, Smørum (DK); Troels Andersen, Smørum (DK)

(73) Assignee: OTICON A/S, Smørum (DK)

( * ) Notice: Subject to any disclaimer, the term of this patent is extended or adjusted under 35 U.S.C. 154(b) by 1239 days.

(21) Appl. No.: 14/459,740

(22) Filed: Aug. 14, 2014

(65) Prior Publication Data
US 2015/0048976 A1 Feb. 19, 2015

(30) Foreign Application Priority Data

Aug. 15, 2013 (EP) ..................................... 13180509

(51) Int. Cl.
H04B 1/40 (2015.01)
H04B 5/00 (2006.01)
(Continued)

(52) U.S. Cl.
CPC ............. *H04B 1/40* (2013.01); *H04B 5/0075* (2013.01); *H04B 7/0602* (2013.01);
(Continued)

(58) Field of Classification Search
CPC .. H04R 25/554; H04R 25/552; H04R 25/407; H04R 2225/55; H04R 25/558;
(Continued)

(56) References Cited

U.S. PATENT DOCUMENTS 5,721,783 A * 2/1998 Anderson .............. H04B 1/385
381/312
6,424,820 B1 7/2002 Burdick et al.
(Continued)

FOREIGN PATENT DOCUMENTS

DE 20114461 U 10/2001
DE 20114461 U1 * 10/2001 ............... H04B 7/06
(Continued)

*Primary Examiner* — Curtis A Kuntz
*Assistant Examiner* — Julie X Dang
(74) *Attorney, Agent, or Firm* — Birch, Stewart, Kolasch & Birch, LLP (57) ABSTRACT The application relates to a portable electronic system comprising a first electronic device and an auxiliary device. The first electronic device comprises a first antenna defining a first spatial direction, and a first wireless unit operationally coupled to the first antenna. The auxiliary device comprises a second antenna defining a second spatial direction, the second antenna comprising a multitude of antenna elements, each defining a specific spatial direction, a second wireless unit operationally coupled to the second antenna, a direction detector configured to provide a direction-signal indicating an estimate of a current value of said second spatial direction relative to a reference direction, and a control unit configured to selectively control the connection of said multitude of antenna elements of the second antenna to said second wireless unit based on said direction-signal from the direction detector. Thereby a wireless link between a hearing assistance device and an auxiliary device can be optimized.

22 Claims, 7 Drawing Sheets (51) Int. Cl.
  *H04B 7/06* (2006.01)
  *H04R 25/00* (2006.01)
  *H04B 7/08* (2006.01)
  *H04W 16/28* (2009.01)
(52) U.S. Cl.
  CPC .......... *H04B 7/0802* (2013.01); *H04W 16/28* (2013.01); *H04R 25/554* (2013.01); *H04R 25/558* (2013.01); *H04R 2460/07* (2013.01)
(58) Field of Classification Search
  CPC ............... H04R 25/70; H04R 2225/41; H04R 2225/43; H04R 2225/51; A63F 13/06; A63F 13/211; A63F 13/428; A63F 13/92; A63F 2300/105; A63F 2300/204; A63F 2300/6676; G03B 17/00; G06F 1/1626; G06F 1/1694; G06F 2200/1614; G06F 2200/1637; G06F 2203/04806; G06F 3/017; G06F 3/0346; G06F 3/0485
  USPC ........... 381/315–318, 23, 370–375; 343/337; 342/13; 345/158; 348/382, 741; 455/456, 455
  See application file for complete search history.

(56) References Cited

U.S. PATENT DOCUMENTS

| | | | |
|---|---|---|---|
| 2006/0232468 A1 | 10/2006 | Parker et al. | |
| 2007/0282393 A1* | 12/2007 | Marquis | H04R 25/30 607/55 |
| 2008/0049945 A1* | 2/2008 | Haenggi | H04R 25/552 381/26 |
| 2008/0192968 A1 | 8/2008 | Ho et al. | |
| 2010/0067723 A1* | 3/2010 | Bergmann | H04M 1/6066 381/315 |
| 2010/0076339 A1* | 3/2010 | Marcoux | A61B 5/04845 600/559 |
| 2010/0184383 A1* | 7/2010 | Lerke | H04R 25/552 455/66.1 |
| 2010/0278365 A1 | 11/2010 | Biundo Lotito et al. | |
| 2010/0278366 A1 | 11/2010 | Biundo Lotito et al. | |
| 2011/0085503 A1* | 4/2011 | Nam | H04B 7/0452 370/329 |
| 2011/0163955 A1* | 7/2011 | Nasiri | A63F 13/06 345/158 |
| 2011/0293129 A1 | 12/2011 | Dillen et al. | |
| 2011/0309980 A1* | 12/2011 | Ali | H01Q 1/1257 342/368 |
| 2012/0259578 A1* | 10/2012 | Bevilacqua | G06F 1/1694 702/141 |
| 2012/0275628 A1* | 11/2012 | Pedersen | H04R 25/558 381/313 |
| 2014/0321682 A1* | 10/2014 | Kofod-Hansen | H04R 25/305 381/315 |
| 2015/0045089 A1* | 2/2015 | He | H01Q 1/243 455/552.1 |

FOREIGN PATENT DOCUMENTS

| | | |
|---|---|---|
| EP | 1956867 A1 | 8/2008 |
| EP | 2116102 B1 | 5/2011 |

* cited by examiner

3DA three coil system
(AuxDv)

FIG. 6B

1DA single coil
(HaDv)

FIG. 6C

TDD-based bidirectional link
(AuxDv)

TDD-based bidirectional link
(HaDv)

PORTABLE ELECTRONIC SYSTEM WITH IMPROVED WIRELESS COMMUNICATION

TECHNICAL FIELD

The present application relates to wireless communication between portable communication devices, e.g. including one or more hearing assistance devices. The disclosure relates specifically to a portable electronic system comprising a first electronic device and an auxiliary device, the first electronic device and the auxiliary device each comprising circuitry allowing the establishment of a uni- or bi-directional wireless link between the devices.

Embodiments of the disclosure may e.g. be useful in applications involving wireless communication between two portable devices, e.g. in a hearing assistance system comprising a hearing assistance device and an auxiliary device, e.g. a remote control, an audio selection device and/or a communication device.

BACKGROUND

The following account of the prior art relates to one of the areas of application of the present application, hearing assistance devices, e.g. hearing aids.

A variety of sensors giving inputs about the current physical environment of a user is increasingly being used in hearing assistance devices. The ready availability of sensors to determine location movement and direction of a body has inspired to a lot of applications in handheld electronic devices in general. A few examples are given in the following.

EP1956867B1 describes the use of an 'inclination-detector' (e.g. gyroscope) to influence the setting of a preferred direction in a directional microphone system.

EP2116102B1 deals with a microphone system, wherein a compass or a gyroscope is used to determine a direction of head orientation of a user.

US2010278366A1 and US2010278365A1 deals with a hearing aid system, e.g. comprising a hearing aid and a handheld device, which are configured to communicate with each other, wherein the handheld device comprises a directional sensor (e.g. a gyroscope) to determine a 'mode of operation' of the system.

US2011293129A1 describes 'head tracking' (e.g. using a gyroscope).

U.S. Pat. No. 5,721,783 describes the use of a number of position determining sensors (incl. a gyroscope) in a remote control device for a hearing aid to determine the current location, etc., of the user.

Magnetic (inductive) wireless systems in hearing systems use one or more coils/antennas to transmit a signal from a hand-held or body-worn device to a hearing instrument. Typically dead-angles in the communication between the devices are experienced leading to drop-outs or reduced quality of the transmitted signal.

The transmission power could in principle be increased to reduce the problem. In practice, however, the available bandwidth and transmit power of a transmitted signal is limited due to regulation as well as technological challenges (large transmission power requires high voltage swings, potentially increasing IC costs (special processing) and leading to large (battery) power consumption).

The dead angles may alternatively be reduced by using two coils which simultaneously transmit the signal with one of the coils being phase-shifted 90 degrees (cf. e.g. US 2009/029646 A1). To completely remove the dead angles, a third coil is required, but this effectively halves the available data bandwidth, since the third coil cannot be used at the same time as the other two. It also adds (audio) latency to the system.

An alternative solution could be to measure the link quality in the auxiliary device in all three dimensions of a three dimensional antenna (e.g. 3 inductor coils having their winding axes oriented perpendicular to each other) when receiving data from a hearing assistance device, and to select a (received) signal for processing as the one having superior quality (e.g. the higher signal strength and/or the lower bit error rate). Such solution may, however, still exhibit drop-outs (especially when a relative movement between the head (hearing assistance device) and the auxiliary device is observed), since the decision to select a signal from a particular antenna is made based on 'old information', especially if a significant amount of the bandwidth is not to be eaten up by these link-quality packets'.

SUMMARY

The main idea of the present application is to provide an estimate of the mutual orientation (at a given time) of transmission and reception antennas of two portable devices (worn by the same person) between which a wireless link is established. In an embodiment, knowledge of the estimate of the mutual orientation of the antennas of the two devices is used at a given time to select (in one of the devices) at least one antenna element out of a multitude of (at least two) antenna elements, which provide optimal link conditions (given the general antenna configurations and the distance between the devices/antennas). Thereby drop-outs in the (sound) transmission may be minimized and it may preferably be avoided to re-transmit a signal on one or more of the other (e.g. a third) antenna elements.

The relative orientation of the two devices (or antennas) may e.g. be obtained by using one or more movement or direction detectors, e.g. comprising a gyroscope or an accelerometer or a combined gyroscope/acceleration sensor, a compass, or the like, in the portable auxiliary device and/or in the portable electronic (e.g. hearing assistance) device(s).

A gyroscope can detect an angular movement of an object about an axis. This can e.g. be used to determine (and possibly maintain track of) an orientation of an object (e.g. to track a current direction of the object relative to a reference direction, e.g. a direction of the force of gravity on the object).

An accelerometer can detect a linear movement of an object. A sensor comprising an accelerometer may e.g. provide the magnitude (in a given direction) of the effective acceleration on the body comprising the accelerometer. A multi-axis accelerometer may provide such effective acceleration as a vector indicating direction and magnitude of the effective acceleration on the body in question (effective acceleration meaning the sum of the acceleration originating from the force of gravity of the earth and any other acceleration that the body experiences). An accelerometer may be configured to measure deviations of the direction of movement from a predefined direction, e.g. vertical or horizontal relative to the earth (i.e. parallel or vertical to a direction of the force of gravity of the earth). For a body at rest, a multi-axis accelerometer may provide an estimate of the acceleration vector opposing the gravitational acceleration in a coordinate system defined by the axes of the accelerometer.

Together, the combination of a gyroscope and an accelerometer can detect the current orientation of an object and e.g. monitor its movement over time from a given start orientation/position. However, an estimate of a current orientation of the object can be obtained by a gyroscope alone or an accelerometer alone. A combination of a gyroscope (and/or an accelerometer) located in the auxiliary device and a gyroscope (and/or an accelerometer) located in the portable electronic (e.g. hearing assistance) device can provide an estimate of a current mutual orientation of the two devices (if the information is compared, e.g. in one of the devices or in a third device).

The gyroscope/accelerator solution is a 'feed-forward' system using current information, and hence more likely to avoid drop-outs.

An object of the present application is to improve wireless communication between two portable devices of a portable electronic (e.g. hearing assistance) system. An alternative object of the present application is to optimize power consumption in a portable electronic system.

Objects of the application are achieved by the invention described in the accompanying claims and as described in the following.

A Portable Electronic System:

In an aspect of the present application, an object of the application is achieved by a portable electronic system comprising a first electronic device and an auxiliary device, the first electronic device and the auxiliary device each comprising circuitry allowing the establishment of a uni- or bi-directional wireless link between the devices, wherein, the first electronic device comprises
a first antenna defining a first spatial direction, and
a first wireless unit operationally coupled to the first antenna, and wherein the auxiliary device comprises
a second antenna defining a second spatial direction, the second antenna comprising a multitude of antenna elements, each antenna element defining a specific spatial direction, said second spatial direction being defined relative to said one or more specific spatial directions,
a second wireless unit operationally coupled to the second antenna,
a direction detector configured to provide a direction-signal indicating an estimate of a current value of said second spatial direction relative to a reference direction, and
a control unit configured to selectively control the connection of said multitude of antenna elements of the second antenna to said second wireless unit based on said direction-signal from the direction detector.

This has the advantage of allowing an optimized mutual orientation of the antennas of the electronic device and the auxiliary device, respectively.

In a portable electronic system, according to the present disclosure it is assumed that the devices forming part of a given embodiment of the system are portable together in the configuration in question (preferably in that each device is individually portable).

In an embodiment, the system and the two devices (the first electronic device and the auxiliary device) are adapted to be worn by one person ('the user'). In an embodiment, the two devices are authorized to communicate with each other in advance of (or in connection with) the establishment of a link between them, e.g. via a pairing process. In an embodiment, the electronic device is a hearing assistance device adapted for being worn at the ear or in an ear canal of the person (a user). In general, the auxiliary device is suitable for being arranged at a location relative to the electronic device where a wireless link can be established between the devices. In an embodiment, the auxiliary device is adapted to be carried around the neck of the user in a neck-strap. Alternatively, the auxiliary device may be adapted to be carried by the user, e.g. in a pocket, in a hand, fixed to a belt or to a piece of clothing. In an embodiment, the auxiliary device is arranged at a location within a predefined distance from the first electronic device, e.g. within 2 m, such as within 1.5 m, such as within 1 m, such as within 0.5 m of the first electronic device.

In an embodiment, the control unit is configured to provide that the second wireless unit (in a specific transmit mode of the auxiliary device) selectively stimulates at least one of said multitude of antenna elements based on an input from said direction detector. In an embodiment, the second wireless unit is configured to individually stimulate the multitude of antenna elements of the second antenna. By selectively controlling the individual stimulation (by the second wireless unit) of the multitude of antenna elements of the second antenna and their connection to the second antenna according to the mutual orientation of the first electronic device and the auxiliary device, the quality of the wireless link can be optimized. The selective control—by the control unit based on the direction-signal—of the connection of the multitude of antenna elements of the second antenna to the second wireless unit of the auxiliary device enables that the second wireless unit can selectively stimulate a subset of the multitude of antenna elements based on an input from said direction detector. The term 'a subset of the multitude of antenna elements' is in the present context taken to mean 'at least one, but not all of said multitude of antenna elements'. In an embodiment, the second antenna comprises three (e.g. orthogonally positioned) antenna elements. In an embodiment, the subset of the three antenna elements consists of two or one antenna element.

In an embodiment, the control unit of the auxiliary device is configured to provide a transmit mode, where a signal can be transmitted to the first electronic device. In an embodiment, the auxiliary device is configured to provide a receive mode, where a signal can be received from the first electronic device.

In an embodiment, the selective selection and/or stimulation of the antenna elements of the second antenna is the same in the transmit mode and the receive mode. This need not be the case though (depending on the particular configuration of the first antenna, its ('back-link') transmit power, the receiver sensitivity of the auxiliary device, etc.). In an embodiment, the selective selection and/or stimulation of the antenna elements of the second antenna is different in the transmit mode and the receive mode.

In an embodiment, said selective stimulation includes activation or deactivation of said antenna element(s) (e.g. coupling (or de-coupling) said antenna elements to (or from) the second wireless unit). In an embodiment, said selective stimulation includes electric stimulation with different signal level and/or phase depending on the current input from the direction detector (the direction-signal). In an embodiment, the control unit (in a transmit mode) is configured to stimulate only one of the multitude of antenna elements depending on the current input from the direction detector (e.g. to select one (e.g. one out of three) element for stimulation and to leave the rest un-stimulated, e.g. to thereby save power). In an embodiment, the control unit is configured to stimulate two of the multitude of antenna elements depending on the current input from the direction detector (e.g. to select two elements (e.g. two out of three) for stimulation and to leave the rest un-stimulated). In an embodiment, the two antenna elements are stimulated with the same (information) signal, e.g. with equal amplitude and phase, or alternatively with different amplitudes, but equal phase. In an embodiment, the two antenna elements are stimulated with the same (information) signal, e.g. with equal amplitudes, but different phase (e.g. 90° phase difference), or alternatively with different amplitudes and different phases.

In an embodiment, the control unit is configured to provide that, at a given point in time, at least one of said multitude of antenna elements of the second antenna is identified for NOT being stimulated (in a transmit mode) or for NOT being used (in a receive mode) according to a predefined scheme related to said current value of said second spatial direction relative to said reference direction. In other words, the antenna element(s) (and its(their) corresponding transceiver circuitry) that, at a given point in time, is(are) the least optimally oriented relative to the first antenna is(are) identified, and not stimulated for transmission or used for reception (thereby saving power in the auxiliary device).

In an embodiment, one of the two devices (e.g. the first electronic device, e.g. a hearing assistance device)—when operationally mounted on the user—is assumed to have a predefined (e.g. fixed) orientation relative to the reference direction, e.g. located on a relatively stable position of the body. Thereby the first spatial direction of the first antenna of the portable hearing assistance device has a predefined orientation relative to the reference direction. In an embodiment, the first spatial direction, which represents the direction of the (first) antenna of the first electronic device, when operationally mounted on the user, is determined in advance of use and stored in a memory of the first electronic device and/or the auxiliary device (or selected during use among a number of stored, predefined 'first spatial directions' according to the current situation). In an embodiment, where the first electronic device comprises a hearing assistance device, the first spatial direction is determined during fitting, and stored in a memory of the hearing assistance device and/or the auxiliary device.

In the present context, the term 'orientation' is taken to mean an angle of a first direction (represented by a first direction-vector) with a second direction (represented by a first direction-vector), where the angle is measured in a plane spanned by the first and second direction-vectors.

In an embodiment, the term a 'direction of an antenna element' of the second antenna is e.g. defined by a (possible) axial direction of the element itself (e.g. a longitudinal axis of a coil) or by a dominating direction-vector of an electromagnetic field generated by the antenna element in question (in the configuration in question of the second antenna).

In an embodiment, the auxiliary device comprises a housing. In an embodiment, the form of the housing defines a device orientation. In an embodiment, the form of the housing of the auxiliary device is essentially a box (comprising 6, two and two opposing walls or outer faces), having n fold symmetry around an axis perpendicular to a face of the box. Preferably, n is smaller than or equal to two.

In an embodiment, the reference direction is defined relative to a direction of the force of gravity on the auxiliary device.

In an embodiment, the first antenna comprises an inductor comprising a coil defining said first spatial direction. In an embodiment, the multitude of antenna elements of the second antenna each comprises an inductor comprising a coil defining a respective specific spatial direction. Preferably, the direction defined by a respective coil is a longitudinal direction around which an electrical conductor is wound to provide the windings of the coil.

In an embodiment, the direction detector of the auxiliary device comprises a movement detector. In an embodiment, the direction detector of the auxiliary device comprises an accelerometer capable of detecting acceleration in one, two or three dimensions. In an embodiment, the direction detector of the auxiliary device comprises a gyroscope capable of detecting angular movement about an axis.

In an embodiment, the auxiliary device comprises a combined gyroscope/accelerator sensor, so that the orientation relative to a well defined direction (e.g. vertical) of the auxiliary device can be monitored over time.

In an embodiment, where the location and orientation of the first electronic device, e.g. a hearing assistance device, is fixed, e.g. at or in an ear of a user (or where its movement is known) an estimate of the mutual orientation or the auxiliary device and the hearing assistance device can be established (because the hearing assistance device(s) is(are) known to be at or in the ears of a person wearing both devices). Thereby a relatively simple system comprising a direction detector only in the auxiliary device is provided.

In an embodiment, the direction detector is configured to determine an estimate of a current value of said second spatial direction relative to a reference direction in a situation where the force of gravity exerted on the auxiliary device is balanced by an opposing force (e.g. from a supporting element opposing the force of gravity, such as is the case when the auxiliary device rests on a table or is positioned in a pocket of the user or is attached to a part of the body of the user, or to a piece of clothing worn (e.g. a belt) by the user.

In an embodiment, the portable electronic system (e.g. the auxiliary device) comprises a memory for storing said reference direction. In an embodiment, a normal orientation (e.g. a normal direction, e.g. a direction of a longitudinal axis of an antenna element (e.g. the first spatial direction)) of the first electronic device (and/or the auxiliary device) when worn by the user in an operational position is stored in the memory. In an embodiment, a normal orientation of the first electronic device relative to said reference direction is stored in the memory. Preferably, the control unit is in operational communication with the memory.

In an embodiment, the first electronic unit comprises a first control unit operationally coupled to the first wireless unit and configured for controlling the first wireless unit.

In an embodiment, the first and second wireless units comprise respective receiver and transmitter circuitry allowing a uni-directional wireless link to be established from the auxiliary device to the first electronic device. In such situation (where no 'feedback' from the first electronic device to the auxiliary device is possible), an independent estimate of the mutual orientation of the first and second antennas is particularly useful.

In an embodiment, the first and second wireless units each comprises receiver and transmitter circuitry allowing a bi-directional wireless link to be established between the auxiliary device and the first electronic device. When a bi-directional link is at hand, an information about the current link quality (at the current configuration of antenna elements connected to and stimulated by the second wireless unit) can be sent from the first electronic device to the auxiliary device and used by the control unit to influence (e.g. fine tune) the stimulation signals and/or the choice of antenna elements for stimulation. Additionally or alternatively, possible information about the current orientation of the first electronic device can be transmitted to the auxiliary device and used by the control unit of the auxiliary device. In an embodiment, the receiver of the first electronic device may—in a specific mode where all three antenna elements (coils) are simultaneously stimulated, e.g. in a test-mode, by particular test signals—be configured to identify and/or choose the best of the signals from the multitude of antenna elements of the second antenna (e.g. based on CRC-checks, FEC, SNR-estimates, etc.). In an embodiment, an antenna identifier is inserted in the respective test signals by the control unit of the auxiliary device. The antenna identifier may be used (in the first electronic device) to identify either of the antenna elements as the more beneficial to use. In an embodiment, the control unit of the first electronic device is configured—e.g. in a particular test-mode—to transmit on the back-link said information about of the more beneficial of the antenna elements to use in the current situation back to the auxiliary device. In an embodiment, the control unit of the auxiliary device is configured to include such information as a control of the effect of the stimulation strategy identified using the direction detector. The information may be used to correct (e.g. fine tune) the chosen antenna stimulation strategy (and/or to perform a regulation of the transmit power of the auxiliary device).

In an embodiment, the control unit is configured to provide that said second wireless unit (in a transmit mode) selectively stimulates at least one of said multitude of antenna elements according to a predefined scheme related to said current value of said direction-signal (e.g. to current value of said second spatial direction relative to said reference direction).

In an embodiment, the predefined scheme is stored in said memory as a lookup-table or an algorithm. In an embodiment, the predefined scheme comprises a preferred stimulation of said multitude of antenna elements given a current value of the second spatial direction, assumed to provide a current mutual orientation of the first and second antennas. The preferred stimulation in a given current mutual orientation of the first and second antennas is determined with a view to optimizing the exchange of electromagnetic energy, e.g. to optimizing an inductive coupling between first and second inductive antennas.

In an embodiment, the first antenna comprises one antenna element. In an embodiment, the first antenna is constituted by a single antenna element. In an embodiment, the first electronic device (comprising the first antenna) comprises a hearing assistance device.

In an embodiment, the second antenna comprises three antenna elements each having mutually perpendicular specific spatial directions. In an embodiment, the second antenna comprises two antenna elements each having mutually perpendicular specific spatial directions. In an embodiment, the control unit is configured to select any two of the three antenna elements for stimulation in a given situation. In an embodiment, the control unit and transceiver circuitry is configured to apply electrical signals comprising a carrier frequency $f_c$ to the two antenna elements, wherein the carrier signals of the two electrical signals are phase shifted relative to each other. In an embodiment, the two carrier signals are shifted with a phase constant $\Delta\varphi$ that is substantially an integer multiple of $\pi/2$ (i.e. $\Delta\varphi = n\cdot\pi/2$, where n is an integer different from 0).

In an embodiment, the control unit is configured to transmit the same information signal in three mutually perpendicular first, second and third antenna elements in first and second time slots of a time-division multiplexing scheme, wherein the information signal applied to the first and second antenna elements are phase shifted 90° relative to each other and transmitted in the first time slot, and wherein the information signal applied to the third antenna element is transmitted in the second time slot. Thereby a more robust transmission is provided. In an embodiment, the information signals of the respective time slots may be weighted according to a current value of the direction signal (e.g. to save power).

In an embodiment, the first electronic (e.g. a hearing assistance) device comprises a first direction detector configured to provide a first direction-signal indicating an estimate of a current value of said first spatial direction relative to a reference direction. Preferably, the deviation of the current orientation of the first electronic device from a normal orientation can thereby be identified, in that the first direction-signal being indicative of such deviation. In an embodiment, the first electronic device comprises a first control unit configured to forward the first direction-signal to the auxiliary device. In an embodiment, such information is only transmitted, in case of a change above a predefined threshold value (to minimize back-link communication and thus the draw on a battery of the first electronic device). In an embodiment, the first direction detector of the first electronic device comprises a (linear or angular) movement detector, e.g. an acceleration detector, such as a one, two or three dimensional acceleration detector or a gyroscope. In an embodiment, the first control unit is operationally coupled to the first direction detector and to the first wireless unit. In an embodiment, the first and/or second control unit is/are configured to determine a 'state' of the user, e.g. 'standing', 'sitting', 'lying' (e.g. 'sleeping'), 'moving' (e.g. walking, or 'running'), etc. The determination of the 'state' of the user wearing the portable electronic system is e.g. based on a combination of sensors, e.g. the direction sensor and one or more other sensors (e.g. including sensors of the mental state of the user). In an embodiment, the first control unit is configured for controlling the first wireless unit based on inputs from the first direction detector and the 'state' of the user. In an embodiment, the first control unit is configured to forward the 'state' of the user to the auxiliary device. In an embodiment, the first control unit (of the auxiliary device) is adapted to use the 'state' of the user in the estimation of the mutual orientation of the first electronic device relative to the auxiliary device.

In an embodiment, the transmit power (Tx-power) level is regulated in the auxiliary device and/or in the first electronic device in response to a detected current mutual orientation of the first and second antennas, the Tx-power being increased in case of a deteriorated orientation and decreased in case of an improved orientation. In an embodiment, a link quality is monitored in the auxiliary device and/or in the first electronic device. In an embodiment, a link quality is monitored in the first electronic device and transmitted to the auxiliary device via the wireless link. In an embodiment, the current link quality or the rate of change of link quality is used together with the determined current mutual orientation of the first and second antennas to decide on the most appropriate stimulation scheme for the antenna elements of the auxiliary device.

In an embodiment, a measure of link quality (LQ) is e.g. based on the signal strength of the received signal and/or its bit error rate and/or the gain-settings of the receiver (e.g. of an automatic gain control (AGC) unit) of the receiving (or transmitting) device. In an embodiment, the measure of the quality of the link is based on the gain of an automatic gain control (AGC) unit necessary to achieve a predefined signal to noise ratio (S/N) or bit error rate (BER) of the received signal. In an embodiment, the measure of the quality of the link is additionally based on the field strength of the received signal.

In an embodiment, corresponding values of link quality and the second spatial direction relative to a reference direction and/or the antenna elements used (and responsible for the link quality) at the given point in time are stored in a memory of the auxiliary device. In an embodiment, a learning mode is implemented where such data are recorded. In an embodiment, the learned data are used to control the selected (active) antenna elements of the second antenna (used for stimulation and/or reception) if the link quality corresponding to a given current second spatial direction relative to a reference direction is above a threshold value. If this is not the case, a stimulation according to the predefined scheme may be used.

In an embodiment, the first electronic device (e.g. a hearing assistance device) is adapted to provide a frequency dependent gain to compensate for a hearing loss of a user. In an embodiment, the hearing assistance device comprises a signal processing unit for enhancing the input signals and providing a processed output signal. Various aspects of digital hearing aids are described in [Schaub; 2008].

In an embodiment, the first electronic device comprises an output transducer for converting an electric signal to a stimulus perceived by the user as an acoustic signal. In an embodiment, the output transducer comprises a number of electrodes of a cochlear implant or a vibrator of a bone conducting hearing device. In an embodiment, the output transducer comprises a receiver (speaker) for providing the stimulus as an acoustic signal to the user.

In an embodiment, the first electronic device comprises an input transducer for converting an input sound to an electric input signal. In an embodiment, the first electronic device comprises a directional microphone system adapted to enhance a target acoustic source among a multitude of acoustic sources in the local environment of the user wearing the first electronic device. In an embodiment, the directional system is adapted to detect (such as adaptively detect) from which direction a particular part of the microphone signal originates. This can be achieved in various different ways as e.g. described in the prior art.

In an embodiment, the first electronic device comprises demodulation circuitry for demodulating a received direct electric input from the auxiliary device (or another electronic device) to provide a direct electric input signal representing an audio signal and/or a control signal e.g. for setting an operational parameter (e.g. volume) and/or a processing parameter of the hearing assistance device.

In general, the wireless link can be of any type. In most embodiments of the present scenario, the wireless link is used under power constraints, e.g. in that the first electronic device and the auxiliary device are battery driven devices. Preferably, the wireless link is a link based on near-field communication, e.g. an inductive link based on an inductive coupling between antenna coils of transmitter and receiver parts. In another embodiment, the wireless link is based on far-field, electromagnetic radiation. In an embodiment, the communication via the wireless link is arranged according to a specific modulation scheme, e.g. an analogue modulation scheme, such as FM (frequency modulation) or AM (amplitude modulation) or PM (phase modulation), or a digital modulation scheme, such as ASK (amplitude shift keying), e.g. On-Off keying, FSK (frequency shift keying), PSK (phase shift keying), MSK (Minimum-shift keying) or QAM (quadrature amplitude modulation).

In an embodiment, the communication between the first electronic device and the auxiliary device and/or the other electronic device is in the base band (e.g. in the audio frequency range, e.g. between 0 and 20 kHz). Preferably, however, communication between the auxiliary device and the first electronic device(s) is based on some sort of modulation at frequencies above 100 kHz. Preferably, a frequency range used to establish communication between the listening device and the other device is located below 100 GHz, e.g. located in a range from 50 MHz to 70 GHz, e.g. above 300 MHz, e.g. in an ISM range above 300 MHz, e.g. in the 900 MHz range or in the 2.4 GHz range or in the 5.8 GHz range or in the 60 GHz range (ISM=Industrial, Scientific and Medical, such standardized ranges being e.g. defined by the International Telecommunication Union, ITU). In an embodiment, the wireless link is based on a standardized or proprietary technology. In an embodiment, the wireless link is based on Bluetooth technology (e.g. Bluetooth Low-Energy technology).

In an embodiment, the first electronic device and/or the auxiliary device comprise(s) an electrically small antenna. An 'electrically small antenna' is in the present context taken to mean that the spatial extension of the antenna (e.g. the maximum physical dimension in any direction) is much smaller than the wavelength $\lambda_{Tx}$ of the transmitted electric signal. In an embodiment, the spatial extension of the antenna is a factor of 10, or 50 or 100 or more, or a factor of 1 000 or more, smaller than the carrier wavelength $\lambda_{Tx}$ of the transmitted signal. In an embodiment, the first electronic device is a relatively small device. The term 'a relatively small device' is in the present context taken to mean a device whose maximum physical dimension (and thus of an antenna for providing a wireless interface to the device) is smaller than 15 cm, such as smaller than 5 cm. In an embodiment 'a relatively small device' is a device whose maximum physical dimension is much smaller (e.g. more than 3 times, such as more than 10 times smaller, such as more than 20 times small) than the operating wavelength of a wireless interface to which the antenna is intended (ideally an antenna for radiation of electromagnetic waves at a given frequency should be larger than or equal to half the wavelength of the radiated waves at that frequency). At 860 MHz, the wavelength in vacuum is around 35 cm. At 2.4 GHz, the wavelength in vacuum is around 12 cm. In an embodiment, the first electronic device has a maximum outer dimension of the order of 0.15 m (e.g. a handheld mobile telephone). In an embodiment, the first electronic device has a maximum outer dimension of the order of 0.08 m (e.g. a head set). In an embodiment, the first electronic device has a maximum outer dimension of the order of 0.04 m (e.g. a hearing instrument).

The first electronic device as well as the auxiliary device are portable devices, each typically comprising a local energy source, e.g. a battery, e.g. a rechargeable battery, which—without being exchanged or recharged—is of limited duration (the limited duration being e.g. of the order of hours or days or weeks).

In an embodiment, the first electronic device comprises or is constituted by a hearing assistance device. In an embodiment, the hearing assistance device comprises a hearing aid, e.g. a hearing instrument, e.g. a hearing instrument adapted for being located at the ear or fully or partially in the ear canal of a user or fully or partially implanted, a headset, an earphone, an ear protection device or a combination thereof.

In an embodiment, the auxiliary device is or comprises an audio gateway device adapted for receiving a multitude of audio signals (e.g. from an entertainment device, e.g. a TV or a music player, a telephone apparatus, e.g. a mobile telephone or a computer, e.g. a PC) and adapted for selecting and/or combining an appropriate one of the received audio signals (or combination of signals) for transmission to the first electronic device (e.g. a hearing assistance device). In an embodiment, the auxiliary device is or comprises a remote control for controlling functionality and operation of the first electronic device(s). In an embodiment, the auxiliary device comprises or is integrated with a portable telephone apparatus, e.g. a Smartphone.

In an embodiment, the portable electronic system comprises a hearing assistance system comprising two hearing assistance devices adapted to implement a binaural listening system, e.g. a binaural hearing aid system.

An Auxiliary Device:

In an aspect, a portable auxiliary device is provided by the present application. The auxiliary device comprises circuitry allowing to establish a wireless (audio) link to another device. The auxiliary device comprises a second antenna defining a second spatial direction, the second antenna comprising a multitude of antenna elements, each antenna element defining a specific spatial direction, said second spatial direction being defined relative to said one or more specific spatial directions, a second wireless unit operationally coupled to the second antenna, a direction detector configured to provide a direction-signal indicating an estimate of a current value of said second spatial direction relative to a reference direction, and a control unit configured to selectively control the connection of said multitude of antenna elements of the second antenna to said second wireless unit based on said direction-signal from the direction detector.

It is intended that some or all of the structural features related to the auxiliary device of the system described above, in the 'detailed description of embodiments' or in the claims can be combined with embodiments of the auxiliary device and vice versa.

Further objects of the application are achieved by the embodiments defined in the dependent claims and in the detailed description of the invention.

As used herein, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element or intervening elements may be present, unless expressly stated otherwise. Furthermore, "connected" or "coupled" as used herein may include wirelessly connected or coupled. As used herein, the term "and/or" includes any and all combinations of one or more of the associated listed items. The steps of any method disclosed herein do not have to be performed in the exact order disclosed, unless expressly stated otherwise.

BRIEF DESCRIPTION OF DRAWINGS

The disclosure will be explained more fully below in connection with a preferred embodiment and with reference to the drawings in which.

The figures are schematic and simplified for clarity, and they just show details which are essential to the understanding of the disclosure, while other details are left out. Throughout, the same reference signs are used for identical or corresponding parts.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

Figure 1A:
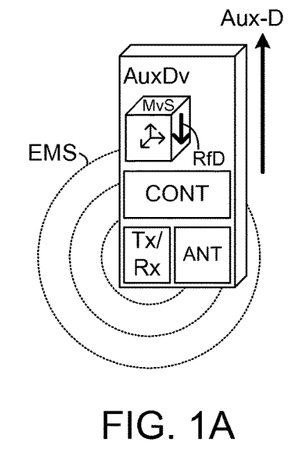
FIGS. 1A-1F schematically show embodiments of elements of a portable electronic system according to the present disclosure.
Figure 1B:
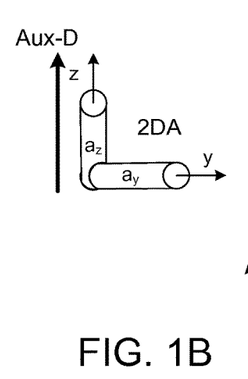
Figure 1C:
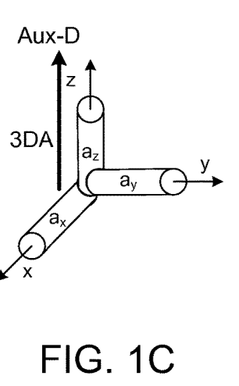
Figure 1D:
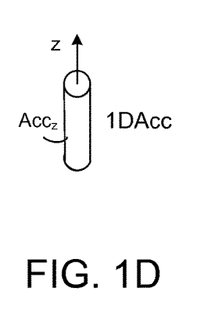
Figure 1E:
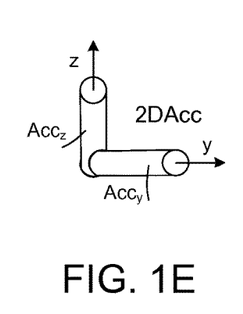
Figure 1F:
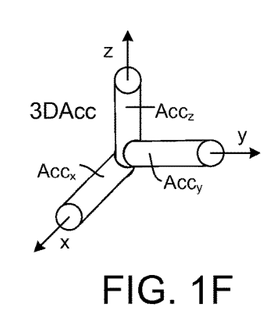

FIGS. 1A-1F show embodiments of elements of a portable electronic system according to the present disclosure. FIG. 1A shows an embodiment of an auxiliary device (AuxDv) comprising a second antenna (ANT) defining a second spatial direction (Aux-D cf. also FIGS. 1B, 1C), the second antenna comprising a multitude of antenna elements ($a_z$, $a_y$, in FIG. 1B, and $a_x$, $a_y$, $a_z$ in FIG. 1C), each antenna element defining a specific spatial direction (x, y, z). The second spatial direction (Aux-D) is defined relative to the one or more specific spatial directions of the antenna elements. In the examples of FIGS. 1A, 1B, 1C, the second spatial direction is equal to specific spatial direction z of antenna element $a_z$ and parallel to a longitudinal direction of the housing of the auxiliary device (e.g. parallel to a rectangular side wall of the housing having the lowest aspect ratio), assuming that the second antenna is oriented in the housing to have its z-direction parallel to said housing). The auxiliary device (AuxDv) further comprises a second wireless unit (Tx/Rx) operationally coupled to the second antenna (ANT), and a direction detector (MvS) configured to provide a direction-signal indicating an estimate of a current value of said second spatial direction (Aux-D) relative to a reference direction (RfD), and a control unit (CONT) configured to selectively control the connection of said multitude of antenna elements ($a_x$, $a_y$, $a_z$) of the second antenna (ANT) to said second wireless unit (Tx/Rx) based on said direction-signal from the direction detector (MvS). The reference direction (RfD) is e.g. the direction of the force of gravity at the location of the auxiliary device (cf. e.g. FIG. 2A). FIG. 1B and FIG. 10 illustrates embodiments of the second antenna (ANT) in the form of a two dimensional antenna (2DA) comprising two (mutually orthogonal) antenna elements ($a_y$, $a_z$), and a three dimensional antenna (3DA) comprising three (mutually orthogonal) antenna elements ($a_x$, $a_y$, $a_z$), respectively. FIGS. 1D, 1E, 1F each schematically illustrates embodiments of a direction detector (MvS) in the form of a one, two and three axis movement sensor (e.g. an accelerometer), respectively.

FIG. 1D illustrates a one axis accelerometer 1DAcc comprising an accelerometer $ACC_z$ for detecting a movement (an acceleration) along an axis (here termed the z-axis). FIG. 1E illustrates a two axis accelerometer 2DAcc comprising two (mutually orthogonal) accelerometers $ACC_y$, $ACC_z$, each for detecting a movement (an acceleration) along respective axes (here termed the y- and z-axis), i.e. a resulting movement in the plane spanned by the y-z-axes. FIG. 1F illustrates a three axis accelerometer 3DAcc comprising three (mutually orthogonal) accelerometers $ACC_x$, $ACC_y$, $ACC_z$, each for detecting a movement (an acceleration) along respective axes (here termed the x-, y- and z-axis), i.e. a resulting movement in the space spanned by the x-y-z-axes.

Figure 2A:
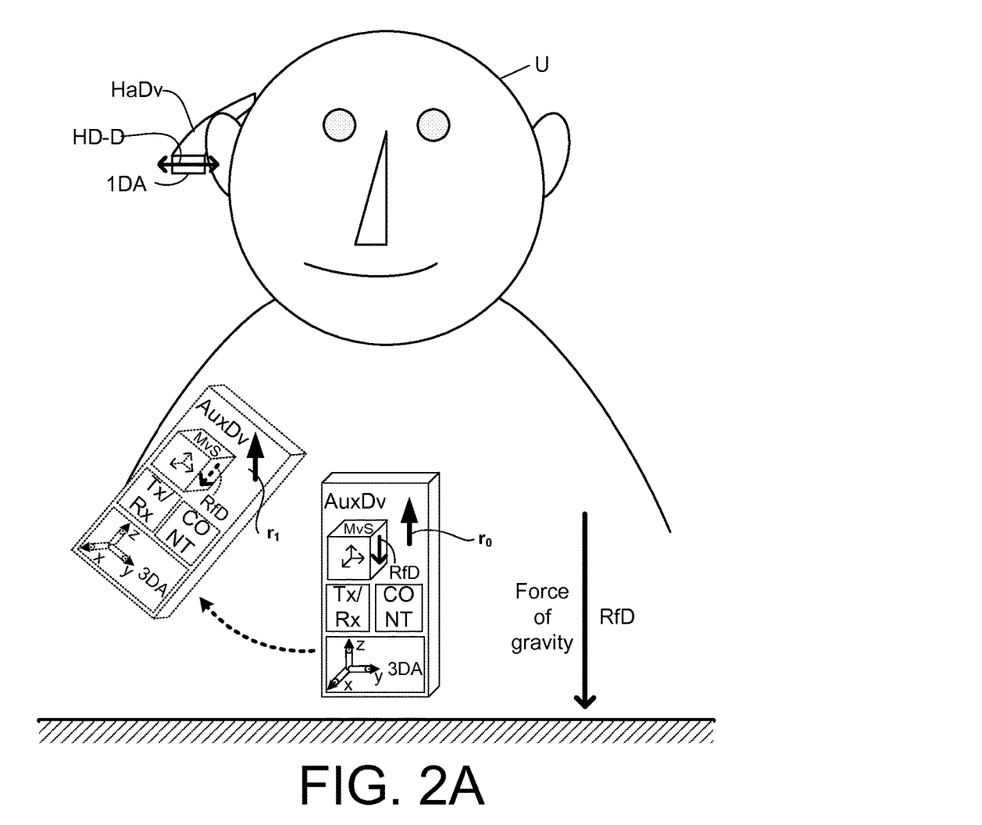
FIGS. 2A-2C show a first use scenario for an embodiment of a portable hearing assistance system comprising a hearing assistance device and an auxiliary device (e.g. an audio gateway and/or a portable telephone) according to the present disclosure (FIG. 2A), initial and current acceleration vectors in a two-dimensional (FIG. 2B) and three-dimensional (FIG. 2C) fixed coordinate system, respectively, FIG. 3 schematically shows a second use scenario for an embodiment of a portable hearing assistance system comprising a binaural hearing aid system comprising first and second hearing instruments and an auxiliary device according to the present disclosure.

FIG. 2A shows a first use scenario for an embodiment of a portable electronic system, here a portable hearing assistance system, comprising a first electronic device, here a hearing assistance device (HaDv), and an auxiliary device (AuxDv, e.g. an audio gateway and/or a portable telephone) according to the present disclosure. The first electronic (hearing assistance) device and the auxiliary device each comprises circuitry allowing the establishment of a uni- or bi-directional wireless link between the devices The hearing assistance device HaDv is shown as a device mounted at the ear of a user U. The hearing assistance device (HaDv) of the embodiment of FIG. 2A comprises a wireless unit, e.g. based on inductive communication. The wireless unit (e.g. a transceiver) at least comprises a receiver (here comprising an inductive receiver, and including a coil (1DA) coupled to the receiver circuitry), which is inductively coupled to one or more coils (3DA) in a transceiver of the auxiliary device (AuxDv). The inductive link between the auxiliary device and the hearing assistance device can be one-way (from the auxiliary device), but may alternatively be two-way (e.g. to be able to exchange control signals between the devices, e.g. to agree on an appropriate transmission channel and/or antenna configuration). In an embodiment, where the hearing assistance device does not comprise any directional sensor, it is assumed that the hearing assistance device is mounted at its normal position at an ear or in an ear of a user. In many normally occurring situations for a typical user, the orientation (or first spatial direction, HD-D) of the (first) antenna (1DA) is fixed and known. Here the first spatial direction, HD-D is shown to be horizontal (perpendicular to (vertical) direction of the force of gravity exerted on the hearing assistance device or the auxiliary device).

The auxiliary device (AuxDv) shown in the system of FIG. 2A comprises the same basic elements shown and described in connection with FIG. 1. The auxiliary device (AuxDv) comprises a direction detector (MvS) comprising a three dimensional movement sensor. The direction detector is configured to monitor a change of orientation of the auxiliary device (AuxDv) from a start (or reference) orientation (vector $r_0$ or RfD, respectively) to a current orientation (vector $r_1$) in a fixed coordinate system, e.g. defined by the (second) antenna (3DA) of the auxiliary device. In the reference orientation, the auxiliary device (AuxDv) is vertically oriented (bold outline), whereas in the 'current' situation, the auxiliary device is tilted (dotted outline) an angle φ compared to the reference situation, cf. FIG. 2B (two dimensional approximate representation), and FIG. 2C (three dimensional representation). The antenna (3DA) of the auxiliary device comprises three mutually perpendicular coils defining directions x, y, z of an orthogonal coordinate system. In the embodiment shown in FIG. 2A, the direction detector (MvS) determines a present direction of the resulting static acceleration opposing the acceleration due to gravity (to achieve an object at rest). Thereby a current deviation from a reference direction, e.g. the direction (RfD) of the force of gravity exerted on the auxiliary device can be determined. Assuming (or measuring) a (current) orientation of the hearing assistance device (and storing such assumption in or communicating such measurement to the auxiliary device) an optimal stimulation strategy for a subset of the three antenna elements of the antenna (3DA) of the auxiliary device (AuxDv) can be determined (e.g. by the control unit CONT) and applied to the antenna (3DA) via the transceiver circuitry (Tx/Rx).

The auxiliary device (AuxDv) may e.g. be carried around the neck of the user in a neck-strap. Alternatively, the auxiliary device may be carried by the user, e.g. in a pocket, in a hand, fixed to a belt or a piece of clothing.

Figure 2B:
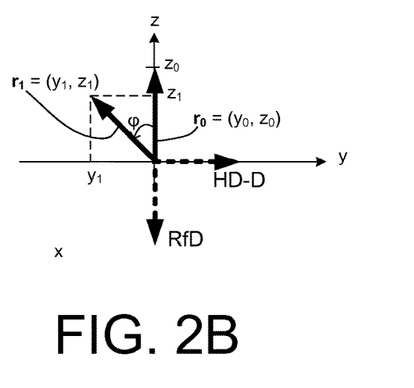
Figure 2C:
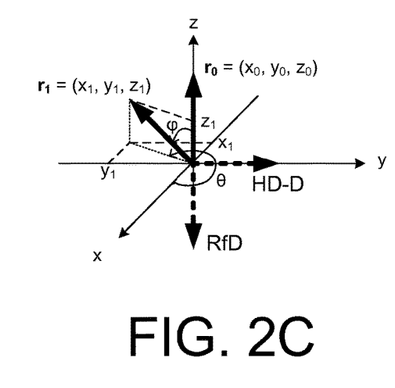

FIGS. 2B and 2C illustrates parameters related to the orientation of the auxiliary device (AuxDv) in a two-dimensional and a three-dimensional (fixed) orthogonal coordinate system, respectively, corresponding to a two-axis and a three-axis directional sensor, respectively. FIG. 2B shows an y-z orthogonal coordinate system. Initial $r_0$ (=($y_0$, $z_0$) and ($x_0$, $y_0$, $z_0$), respectively, e.g. at a time t=$t_0$, see FIG. 3) and current $r_1$ (=$z_1$) and ($x_1$, $y_1$, $z_1$), respectively, e.g. at a time t=$t_1$, see FIG. 3) values (e.g. acceleration vectors) of the second spatial direction are illustrated in the two exemplary coordinate systems. The first spatial direction (HD-D) of the first antenna (1DA) of the hearing assistance device (HaDv) and the (exemplary) reference direction (RfD) are shown in FIGS. 2B and 2C to be in the y- and opposite the z-directions, respectively. The angle φ of the current spatial direction $r_1$ with the z-axis (and thus the initial direction $r_0$ of the second antenna (3DA) of the auxiliary device (AuxDv)) are illustrated in FIGS. 2B and 2C. The angle θ in the x-y plane defining the current, three-dimensional spatial direction $r_1$ of the (second) antenna (3DA) of the auxiliary device (AuxDv) is shown in FIG. 2C.

Figure 3:
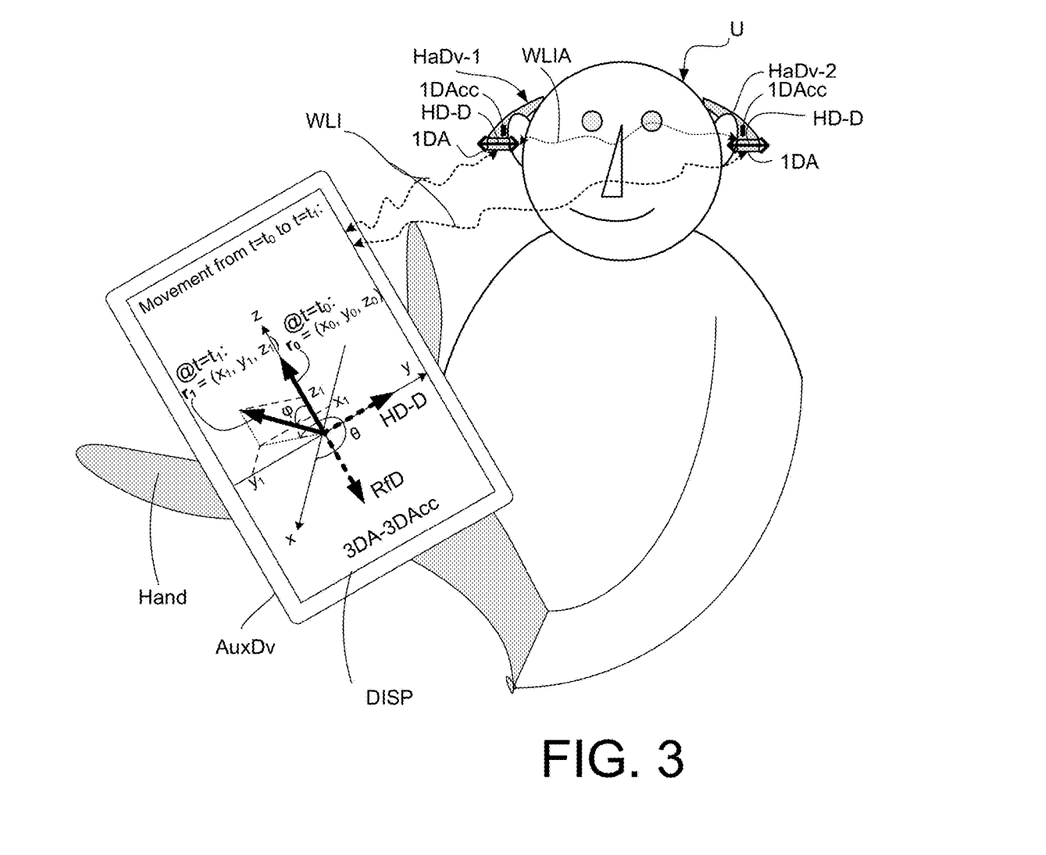

FIG. 3 shows a second use scenario for an embodiment of a portable hearing assistance system comprising a binaural hearing aid system comprising first and second hearing instruments and an auxiliary device according to the present disclosure. The binaural hearing aid system comprises first and second hearing instruments (HaDv-1, HaDv-2) adapted for being located at or in left and right ears of a user. The setup of each hearing instrument is as described in connection with FIG. 2. The hearing instruments are further adapted for exchanging information between them via a wireless communication link, e.g. a specific inter-aural (IA) wireless link (WLIA). The two hearing instruments HaDv-1, HaDv-2 are adapted to allow the exchange of status or control signals, e.g. including the transmission of characteristics of the input signal received by a device at a particular ear to the device at the other ear and/or status information of the device, e.g. the present orientation of its antenna(s) (or a deviation from a reference value. To establish the inter-aural link (WLIA), each hearing instrument comprises antenna and transceiver circuitry. The status or control signals from the local and the opposite device are e.g. used together to influence a decision or a parameter setting in the local device or in the auxiliary device (e.g. a simulation strategy of an antenna of the hearing assistance and/or auxiliary devices). The control signals (incl. e.g. the antenna orientation) may e.g. comprise information that enhances system quality to a user, e.g. improve signal processing. Each of the hearing instruments (HaDv-1, HaDv-2) comprises a direction detector (here a one-axis accelerometer (1DAcc)). The user (U) of the portable hearing assistance system is indicated to carry the auxiliary device (AuxDv) in a hand (Hand). The auxiliary device (AuxDv) and the first the hearing instruments (HaDv-1, HaDv-2) each comprise circuitry allowing the establishment of a uni- or (as shown) a bi-directional wireless link (WLI) between the devices, e.g. based on an inductive coupling (e.g. a proprietary or standardized, e.g. NFC, protocol). Alternatively, the wireless link may be based on radiated fields (e.g. according to Bluetooth). The Auxiliary device (AuxDv) comprises a three-axis direction detector (3DAcc) The (second) antenna of the auxiliary device is three dimensional antenna (3DA) comprises three orthogonal antenna elements (coils). The Auxiliary device (AuxDv) (e.g. a SmartPhone) comprises a display (DISP), whereon the initial (@t=$t_0$) and current (@t=$t_1$) estimate of the mutual orientation of the auxiliary device and hearing instruments is illustrated (as also shown in and described in connection with FIG. 2C).

Figure 4A:
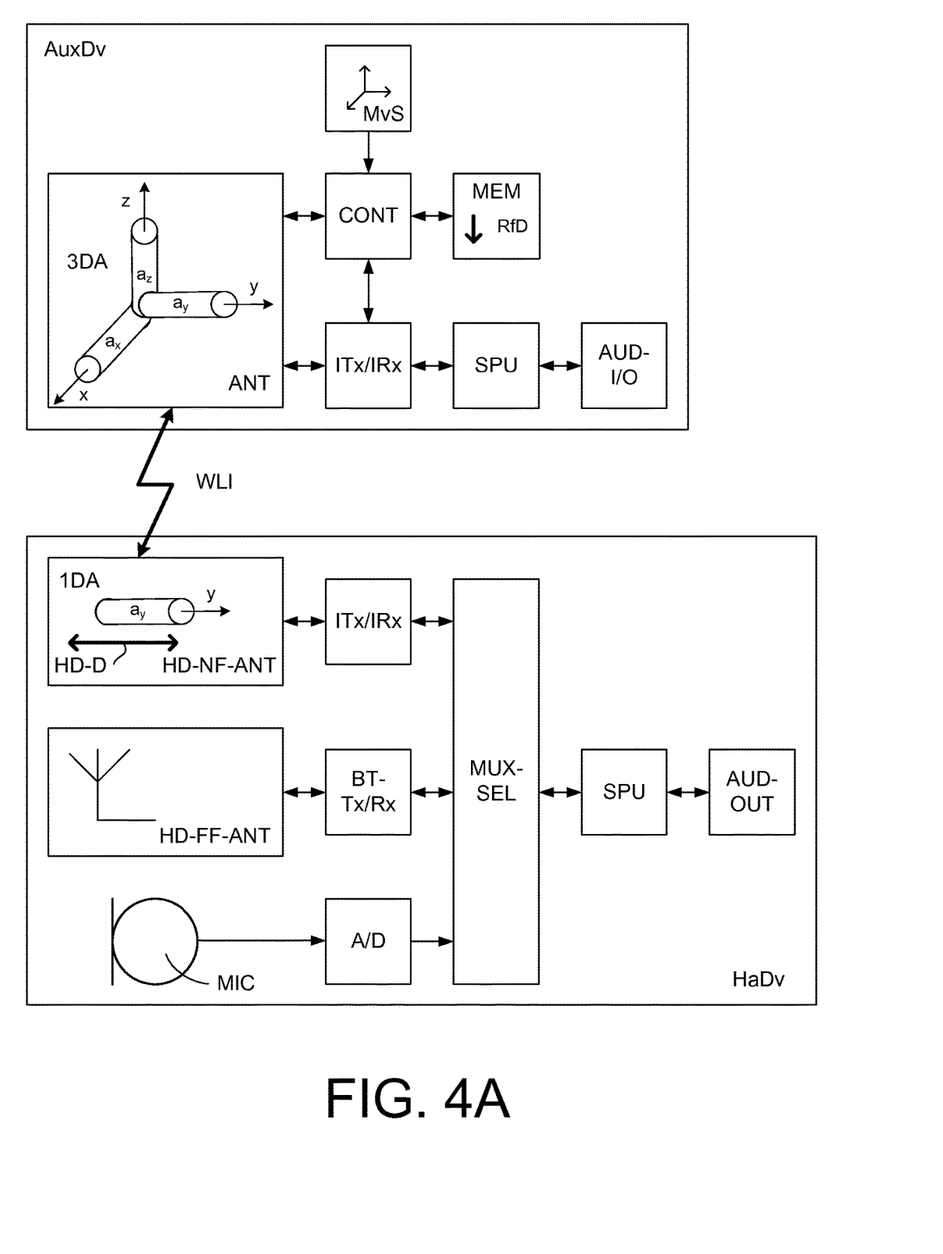
FIGS. 4A-4B show block diagrams of respective embodiments of a portable hearing assistance system according to the present disclosure, FIG. 4A illustrating an embodiment where the hearing assistance device does NOT comprise a directional detector, and FIG. 4B an embodiment where it DOES, FIGS. 5A-5C schematically show exemplary configurations of inductive coupling between coil antenna elements, FIG. 5A illustrating a situation with good coupling conditions where the coil elements have co-parallel axes, FIG. 5B illustrating a situation with poor coupling conditions where the coil elements have perpendicular axes, and FIG. 5C showing a rotating magnetic field generated by two perpendicular coils, and FIGS. 6A-6E schematically show a third use scenario of a portable hearing assistance system, wherein a bi-drectional link is established between the hearing assistance device and the auxiliary device.
Figure 4B:
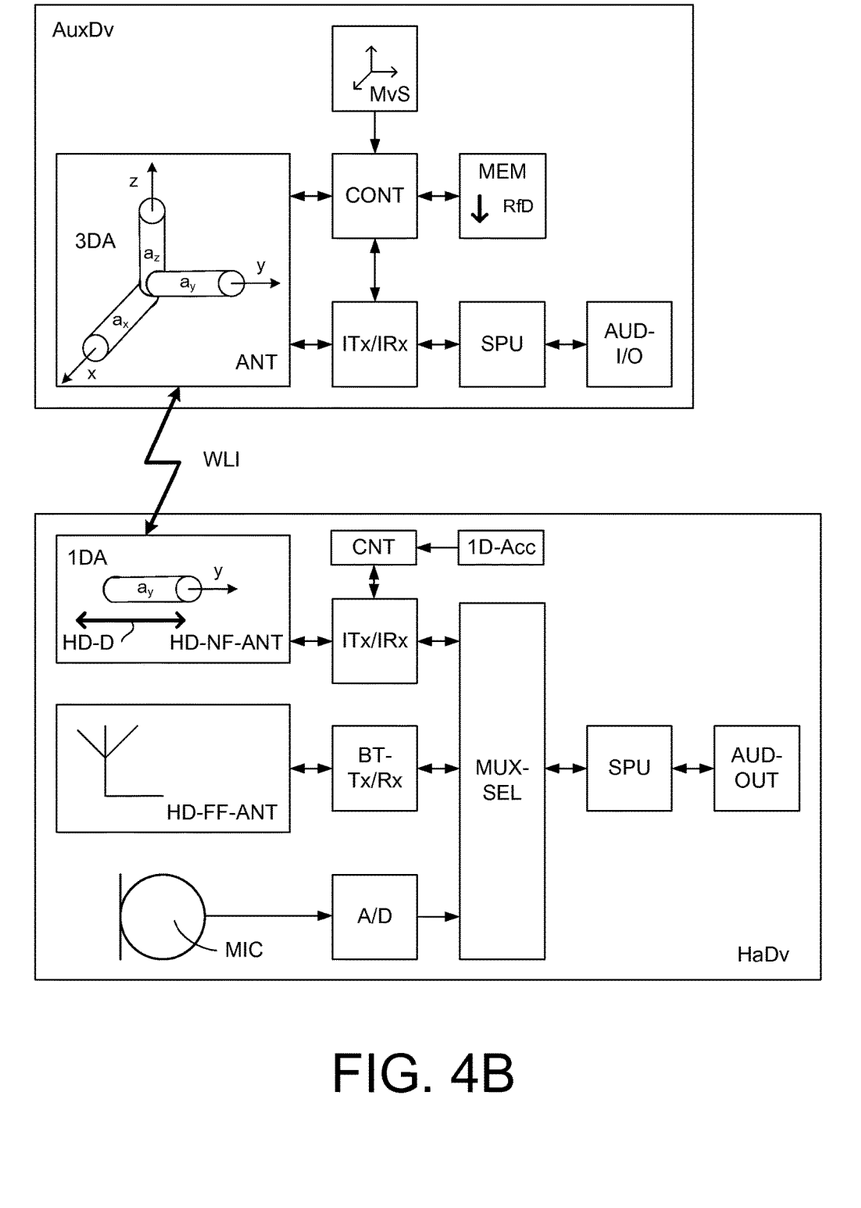

FIGS. 4A-4B show block diagrams of respective embodiments of a portable hearing assistance system according to the present disclosure, FIG. 4A illustrating an embodiment where the hearing assistance device does NOT comprise a directional detector, and FIG. 4B an embodiment where it DOES.

The hearing assistance device (HaDv) of FIG. 4A comprises three I/O paths (providing input and optionally output signals). A first I/O path comprises an input transducer (MIC, e.g. a microphone, e.g. a directional microphone system) for converting an input sound to an electric input signal and an analogue to digital converter (A/D) for digitizing the signal. A second I/O path comprises an antenna (HD-FF-ANT) and transceiver circuitry (BT-Tx/Rx) for establishing a wireless link to another device, e.g. based on far-field communication, e.g. according to the Bluetooth standard (e.g. including Bluetooth Low Energy). Preferably audio and/or control signals can be received and/or transmitted via the (far-field) link. A third I/O path comprises a (first) antenna (HD-NF-ANT) in the form of a coil for establishing a wireless link (WLI) to another device (including the auxiliary device, AuxDv). The antenna (HD-NF-ANT) is indicated to be one-dimensional (1DA) and comprise a single (coil) antenna element ($a_y$) having its coil axis along an y-direction (of a coordinate system fixed relative to a housing of the hearing assistance device), thereby defining a (first) spatial direction (HD-D) of the (first) antenna of the hearing assistance device. The antenna (HD-NF-ANT) is operationally coupled to wireless unit (ITx/IRx), here inductive transceiver circuitry. The wireless unit (ITx/IRx) is comprises appropriate A/D-conversion and demodulation circuitry for digitizing and demodulating a received direct electric input from the auxiliary device (or another electronic device) to provide a direct electric input signal representing an audio signal and/or a control signal. The hearing assistance device (HaDv) further comprises a signal processing unit (SPU) for processing an input signal, e.g. applying a frequency dependent gain according to a user's needs. The signal processing unit (SPU) is coupled to an output device (AUD-OUT), e.g. an output transducer, e.g. for providing an output signal perceivable to a user as sound (or a signal for being forwarded to another device). The signals of the three I/O paths are operationally connected to the signal processing unit (SPU) via a controllable multiplexer/selector unit (MUX-SEL). Hence, the signal processing unit (SPU) can be operationally coupled to any of the microphone (MIC), the far-field link or the inductive link circuitry, alone or in combination, the signal to the signal processing unit e.g. comprising a mixture of the audio signals.

The auxiliary device (AuxDv) of FIG. 4A comprises the elements of the embodiments of FIGS. 1A and 2A, including a (second) antenna (ANT) comprising a three dimensional structure (3DA) comprising three coil antenna elements ($a_x$, $a_y$, $a_z$), each defining a specific spatial direction (x, y, z). The (second) antenna (3DA, ANT) is configured to establish an inductive link (WLI) to the hearing assistance device (HaDv) and is operationally coupled to wireless unit (ITx/IRx) in the form of inductive transceiver circuitry (comprising ND-conversion and demodulation circuitry as appropriate). The wireless unit (ITx/IRx) is operationally coupled to a signal processing unit (SPU) for processing an input signal, which is coupled to an input/output device (AUD-I/O) for sourcing or sinking an audio signal (e.g. from another device). The auxiliary device (AuxDv) further comprises a direction detector (MvS) configured to provide a direction-signal indicating an estimate of a current value of the (second) spatial direction of the (second) antenna (3DA, ANT) relative to a reference direction (RfD in FIG. 2). The auxiliary device (AuxDv) further comprises a control unit (CONT) configured to selectively control the connection of three antenna elements of the (second) antenna (3DA, ANT) to the (second) wireless unit (ITx/IRx) based on the direction-signal from the direction detector (MvS). The control unit (CONT) is thus operationally connected to the direction detector (MvS), to the antenna (3DA, ANT), and to the wireless unit (ITx/IRx), and configured to control the latter. The auxiliary device (AuxDv) further comprises a memory (MEM) for storing the reference direction (RfD, cf. FIG. 2). The control unit (CONT) is thus operationally connected to the memory (MEM) allowing e.g. to read said reference direction from the memory and optionally to write other data related to the current and/or past orientation of the device(s). The direction detector (MvS) preferably comprises a gyroscope or an accelerometer or a combined gyroscope/acceleration sensor. Preferably, a three axis gyroscope and/or accelerometer is implemented.

The hearing assistance system is configured to allow the auxiliary device to determine a relative position of the (first and second) antennas of the hearing assistance device (HaDv) and the auxiliary device (AuxDv), under the assumption that the position of one of the antennas (e.g. the (first) antenna of the hearing assistance device (HaDv)) is known (e.g. assumed fixed).

Figure 6A:
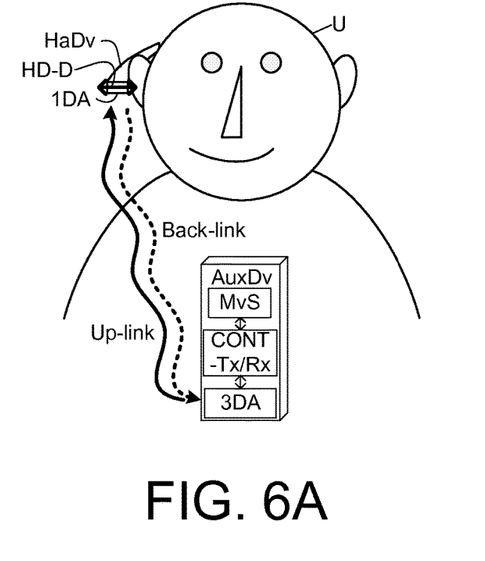
Figure 6B:
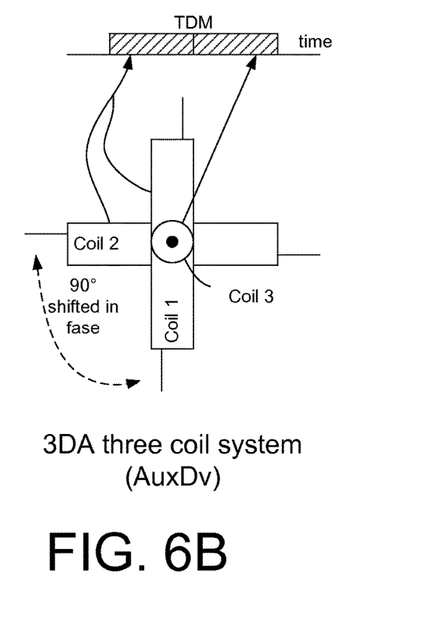
Figure 6C:
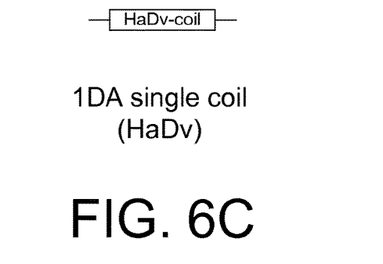

The embodiment of a hearing assistance system shown in FIG. 4B comprises the same elements as the one shown in FIG. 4A. Additionally, the hearing assistance device (HaDv)

comprises a direction detector (1D-Acc) in the form of an accelerometer, e.g. a one-axis accelerometer. The hearing assistance device (HaDv) further comprises a control unit (CNT) operationally coupled to the direction detector (1D-Acc) and to the (first) wireless unit (ITx/IRx) and configured for controlling the latter, e.g. inserting information of the current orientation (HD-D) of the (first) antenna (HD-NF-ANT) in a back-link information stream to the auxiliary device (AuxDv, cf. e.g. FIG. 6A). The hearing assistance system of FIG. 4B is thus configured to allow the auxiliary device to determine a relative position of the (first and second) antennas of the hearing assistance device (HaDv) and the auxiliary device (AuxDv) (without the assumption that the position of one of the antennas being known, e.g. assumed fixed). In the example of FIG. 4B the direction detector (1D-Acc) of the first electronic device (the hearing assistance device (HaDv)) is a single direction acceleration detector. It may in general, for example comprise an accelerometer and/or a gyroscope capable of detecting linear and/or angular acceleration, respectively, in one, two or three dimensions.

Figure 5A:
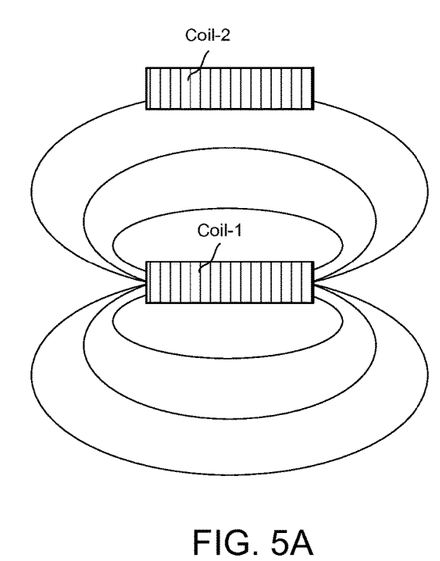
Figure 5B:
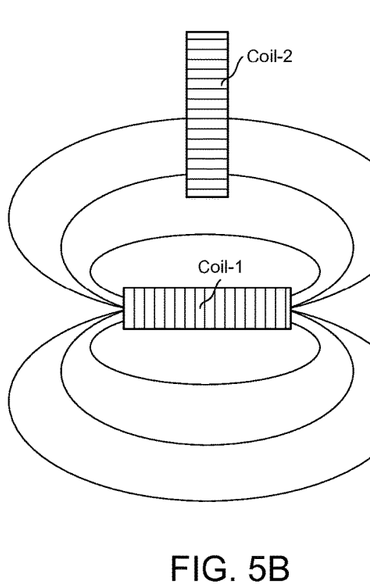
Figure 5C:
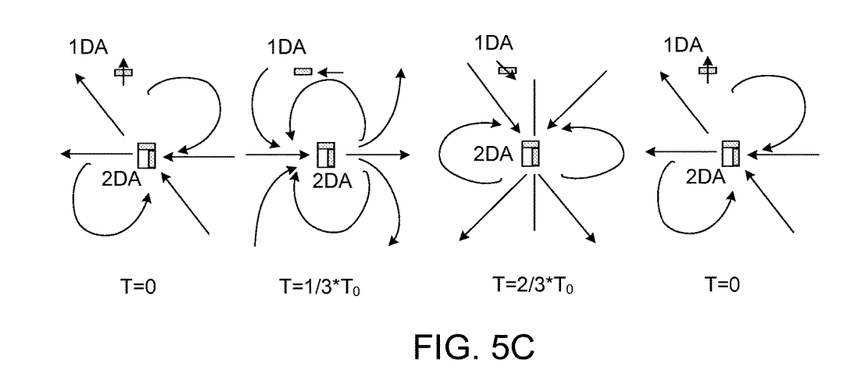

FIGS. 5A-5C show exemplary configurations of inductive coupling between coil antenna elements. FIG. 5A illustrates a situation with good coupling conditions where the coil elements have co-parallel axes, resulting in the magnetic field generated by Coil-1 being optimally received by (receiving) Coil-2. FIG. 5B illustrates a situation with poor coupling conditions where the coil elements have perpendicular axes, where the magnetic field generated by Coil-1 is not received by (cannot enter the coil windings of) Coil-2. FIG. 5C schematically shows a rotating magnetic field generated by two perpendicular coils (second antenna 2DA of an auxiliary device AuxDv) stimulated with the same (but with a 90° phase difference) alternating electric signal of repetition period $T_0$ (frequency $f_c=1/T_0$) at four different points in time (from left to right), at t=0, t=($\frac{1}{3}$)$T_0$, t=($\frac{2}{3}$)$T_0$, and t=$T_0$. This stimulation scenario is e.g. discussed in US 2009/029646 A1. The direction of the resulting magnetic field at the location of the (first) antenna (1DA) of hearing assistance device (HaDv) is schematically illustrated by a small arrow (e.g. ↑ through the antenna 1DA in the left graph for t=0). As thereby indicated, the rotating magnetic field ensures a good coupling between the (first and second) antennas (1DA, 2DA) at least once every cycle ($T_0$) of the carrier frequency $f_c$ of the applied alternating signal, in the geometrical configuration shown in FIG. 5C (where the coils of the (first and second) antennas (1DA, 2DA) are located (substantially) in the same geometrical plane).

FIG. 5 generally indicates that in case of the availability of a three dimensional antenna coil (e.g. the second antenna of the auxiliary device AuxDv) for generating a magnetic field to be received by a single antenna coil (e.g. the first antenna of the hearing assistance device HaDv) a choice between one of the possible combinations of two antenna elements for generating the magnetic field (the third element not being stimulated or being less stimulated) can advantageously be performed depending on the mutual orientation of the (first and second) antennas.

FIGS. 6A-6E show a third use scenario of a portable hearing assistance system, wherein a bi-directional link (Up-link, Back-link) is established between the hearing assistance device and the auxiliary device. The third scenario is substantially equal to the first scenario described in connection with FIG. 2, wherein a user (U) wears a hearing assistance device (HaDv) at an ear, the hearing assistance device comprising a first (single coil) antenna (1DA) defining a first spatial direction (HD-D). The user (U) further wears an auxiliary device (AuxDv) comprising a housing wherein a second (three dimensional) antenna (3DA) defining a second spatial direction (Aux-D, cf. FIGS. 1A-1C) is located. The second antenna (3DA) comprises three antenna elements, each antenna element defining a specific spatial direction, the second spatial direction (Aux-D) being defined relative to three specific spatial directions. The auxiliary device (AuxDv) further comprises a direction detector (MvS) configured to provide an estimate of a current value of the second spatial direction relative to a reference direction (RfD), e.g. the direction of the force of gravity on the auxiliary device. The auxiliary device (AuxDv) further comprises a control unit (CONT) configured control the stimulation of the wireless unit (Tx/Rx) and the antenna elements of the antenna (3DA) based on the direction signal from the direction detector (MvS).

In the embodiment of a hearing assistance system in FIG. 6, the inductive wireless link between the auxiliary device and the hearing assistance device is based on time division multiplexing (TDM), i.e. comprises distinct, separate transmit (Tx) and receive (Rx) time slots. The same coil antennas are used for the transmit and receive modes of the respective devices.

The antenna (3DA, cf. FIG. 6B) of the auxiliary device (AuxDv) is a three dimensional coil antenna comprising three orthogonal coils, e.g. three mutually orthogonal coils wound around a common ferrite core, each coil comprising a multitude of windings (as e.g. described in US 2009/046879 A1).

Figure 6D:
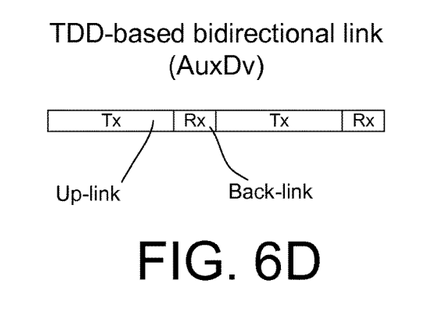
Figure 6E:
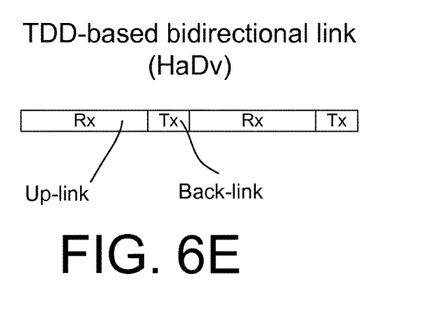

The bi-directional link between the auxiliary device (AuxDv) and the hearing assistance device (HaDv) comprises an Up-link from the auxiliary device to the hearing assistance device and a Back-link from the hearing assistance device to the auxiliary device. The bi-directional link is based on Time Division Duplexing (TDD) as illustrated in FIG. 6D and FIG. 6E showing the time slots for receiving (Rx) and transmitting (Tx) as seen from the two devices, FIG. 6D and FIG. 6E showing the Tx and Rx time slots of the auxiliary device (AuxDv) and the hearing assistance device (HaDv), respectively.

Up-Link:

The same information signal can be transmitted in three mutually perpendicular coils to decrease a risk of signal fall out in the receiver (e.g. due to lack of coupling because of non-optimal orientation of a receiver coil, e.g. in a hearing aid, relative to the transmitter coil(s)). The signals applied to coils 1 and 2 are phase shifted 90° relative to each other (cf. FIG. 6B) resulting in the creation of a rotating magnetic field (in two dimensions, cf. e.g. US 2009/029646 A1). The signal of coil 3 is equal to the signal of coil 1. TDM is used between coils (1, 2) and coil (3), respectively. The signals of the coils 1 and 2 are transmitted in a first time slot, whereas the signal of coil 3 is transmitted in a second time slot, as illustrated in the top part of FIG. 6B. The stimulation of the individual coils can, however, preferably be optimized utilizing knowledge of the mutual orientation of the antenna coils of the auxiliary device (AuxDv) and the hearing assistance device (HaDv) as described in the present disclosure. The up-link transmission bit rate is e.g. in the range of 50 kbits to 2 Mbit/s.

The hearing assistance device (HaDv) comprises a single antenna coil (1DA, cf. FIG. 6C) for receiving/transmitting signals from/to the 3D-coil of the auxiliary device.

The auxiliary device comprises a control unit and transceiver circuitry configured to selectively stimulate the second antenna, e.g. at least one of the three antenna elements, based on an input from said direction detector (MvS).

Preferably, the stimulation of the at least one of the three antenna elements is performed according to a predefined scheme related to the current value of the second spatial direction relative to the reference direction (RfD). In an embodiment, the predefined scheme is stored in a memory of the auxiliary device as a lookup-table or an algorithm.

In an embodiment, a current orientation of the first antenna of the hearing assistance device (HaDv) is detected in the hearing assistance device (cf. e.g. FIG. 4B). In an embodiment, the current orientation is transmitted from the hearing assistance device to the auxiliary device (AuxDv) via the back-link.

In an embodiment, the receiver of the hearing assistance device may—in a specific mode where all three antenna elements (coils) are simultaneously stimulated, e.g. in a test-mode—be configured to identify and/or choose the best of the two signals from coils (1, 2) or 3, e.g. based on CRC-checks, FEC, SNR-estimates, etc. In an embodiment, an antenna identifier is inserted in the respective time slot signals, which may be used to identify either coils (1, 2) or coil 3, e.g. as the more beneficial to use. In an embodiment, the control unit of the auxiliary device is configured—e.g. in a particular test-mode—to detect which the 3 coils of the auxiliary device that receives the best signal on the back-link from the hearing assistance device (HaDv). Such (link/ antenna quality) information may via the back-link be returned to the auxiliary device where a control of the effect of the stimulation strategy identified using the direction detector (MvS) can be performed by the control unit of the auxiliary device (AuxDv). The information may further be used to correct (e.g. fine tune) the chosen antenna stimulation strategy (and/or to perform a regulation of the transmit power of the auxiliary device).

Other data that may be transmitted on the back-link may be current settings of the hearing assistance device (e.g. volume), status signals (e.g. battery status), etc.

The invention is defined by the features of the independent claim(s). Preferred embodiments are defined in the dependent claims. Any reference numerals in the claims are intended to be non-limiting for their scope.

Some preferred embodiments have been shown in the foregoing, but it should be stressed that the invention is not limited to these, but may be embodied in other ways within the subject-matter defined in the following claims and equivalents thereof.

REFERENCES

EP1956867B1.
EP2116102B1
US2010278366A1
US2010278365A1
US2011293129A1
U.S. Pat. No. 5,721,783
[Schaub; 2008] Arthur Schaub, Digital hearing Aids, Thieme Medical. Pub., 2008.

The invention claimed is:

1. A portable electronic system comprising:
a first electronic device; and
an auxiliary device, the first electronic device and the auxiliary device each comprising circuitry allowing the establishment of a uni- or bi-directional wireless link between the devices, wherein the first electronic device comprises
a first antenna defining a first spatial direction, and
a first wireless unit operationally coupled to the first antenna, and wherein the auxiliary device comprises
a second antenna defining a second spatial direction, the second antenna comprising a multitude of antenna elements, each antenna element defining a specific spatial direction, said second spatial direction being defined relative to said one or more specific spatial directions,
a second wireless unit operationally coupled to the second antenna,
a direction detector configured to provide a direction-signal indicating an estimate of a current value of said second spatial direction relative to a reference direction, the reference direction being defined relative to a direction of the force of gravity on the auxiliary device, and
a control unit configured to selectively control the connection of said multitude of antenna elements of the second antenna to said second wireless unit based on said direction-signal from the direction detector and transmit the same information signal in said multitude of antenna elements of the second antenna.

2. A portable electronic system according to claim 1 wherein the second wireless unit is configured to individually stimulate the multitude of antenna elements of the second antenna.

3. A portable electronic system according to claim 1 wherein the first antenna comprises an inductor comprising a coil defining said first spatial direction.

4. A portable electronic system according to claim 1 wherein said multitude of antenna elements of the second antenna each comprises an inductor comprising a coil defining a respective specific spatial direction.

5. A portable electronic system according to claim 1 wherein said direction detector comprises a movement detector.

6. A portable electronic system according to claim 1 wherein said direction detector comprises an accelerometer capable of detecting acceleration in one, two or three dimensions.

7. A portable electronic system according to claim 1 wherein said direction detector comprises a gyroscope capable of detecting angular movement about an axis.

8. A portable electronic system according to claim 1 comprising a memory for storing said reference direction.

9. A portable electronic system according to claim 1 wherein said first and second wireless units comprise respective receiver and transmitter circuitry allowing a uni-directional wireless link to be established from the auxiliary device to the first electronic device.

10. A portable electronic system according to claim 1 wherein said first and second wireless units each comprises receiver and transmitter circuitry allowing a bi-directional wireless link to be established between the auxiliary device and the first electronic device.

11. A portable electronic system according to claim 1 wherein said control unit is configured to provide that said second wireless unit selectively stimulates at least one of said multitude of antenna elements according to a predefined scheme related to said current value of said direction-signal.

12. A portable electronic system according to claim 11 wherein said predefined scheme is stored in a memory of the system as a lookup-table or an algorithm.

13. A portable electronic system according to claim 1 wherein said second antenna comprises three antenna elements each having mutually perpendicular specific spatial directions.

14. A portable electronic system comprising:

a first electronic device; and an auxiliary device, the first electronic device and the auxiliary device each comprising circuitry allowing the establishment of a or bi-directional wireless link between the devices, wherein the first electronic device comprises
- a first antenna defining a first spatial direction,
- a first wireless unit operationally coupled to the first antenna, and
- a first direction detector configured to provide a first direction-signal indicating an estimate of a current value of said first spatial direction relative to a first reference direction, and wherein the auxiliary device comprises
- a second antenna defining a second spatial direction, the second antenna comprising a multitude of antenna elements, each antenna element defining a specific spatial direction, said second spatial direction being defined relative to said one or more specific spatial directions,
- a second wireless unit operationally coupled to the second antenna,
- a direction detector configured to provide a direction-signal indicating an estimate of a current value of said second spatial direction relative to a second reference direction, and
- a control unit configured to selectively control the connection of said multitude of antenna elements of the second antenna to said second wireless unit based on said direction-signal from the direction detector and transmit the same information signal in said multitude of antenna elements of the second antenna.

15. A portable electronic system according to claim 14, wherein the first electronic device comprises a first control unit configured to forward the first direction-signal to the auxiliary device.

16. A portable electronic system according to claim 1 wherein the first electronic device comprises or is constituted by a hearing assistance device.

17. A portable electronic system according to claim 1 wherein the first antenna is constituted by a single antenna element.

18. A portable electronic system according to claim 1 wherein the first electronic device and the auxiliary device are adapted to be worn by one person, the user.

19. A portable electronic system according to claim 13 wherein said control unit is configured to transmit the same information signal in three mutually perpendicular first, second and third antenna elements in first and second time slots of a time-division multiplexing scheme, wherein the information signal applied to the first and second antenna elements are phase shifted 90° relative to each other and transmitted in the first time slot, and wherein the information signal applied to the third antenna element is transmitted in the second time slot.

20. A portable electronic system according to claim 2 wherein said selective stimulation includes electric stimulation with a different signal level and/or phase depending on the current direction-signal from the direction detector.

21. A portable electronic system according to claim 16 wherein the hearing assistance device comprises a hearing aid, a headset, an earphone, an ear protection device or a combination thereof.

22. A portable electronic system according to claim 21 wherein the hearing aid comprises a hearing instrument adapted for being located at the ear or fully or partially in the ear canal of a user or fully or partially implanted.

* * * * *